(12) United States Patent
Chiang et al.

(10) Patent No.: US 7,016,572 B2
(45) Date of Patent: Mar. 21, 2006

(54) OPTICALLY INTEGRATED DEVICE

(75) Inventors: Po-Liang Chiang, Taipei (TW);
Hsin-Wen Tsai, Teipei (TW)

(73) Assignee: United Microelectronics Corp., (TW)

( * ) Notice: Subject to any disclaimer, the term of this patent is extended or adjusted under 35 U.S.C. 154(b) by 148 days.

(21) Appl. No.: 10/653,266

(22) Filed: Sep. 3, 2003

(65) Prior Publication Data

US 2005/0047744 A1 Mar. 3, 2005

(51) Int. Cl.
*G02B 6/00* (2006.01)

(52) U.S. Cl. .......................................... 385/39; 359/651

(58) Field of Classification Search ............ 385/14–16, 385/24, 31, 39, 50, 88, 129, 146, 147; 359/651, 359/739; 353/20, 31, 102, 69, 103
See application file for complete search history.

(56) References Cited

U.S. PATENT DOCUMENTS

| | | | | |
|---|---|---|---|---|
| 5,621,498 A | * | 4/1997 | Inoue et al. .................. 355/67 |
| 5,634,704 A | * | 6/1997 | Shikama et al. ............... 353/31 |
| 5,748,288 A | * | 5/1998 | Nagano et al. ................ 355/53 |
| 5,802,222 A | * | 9/1998 | Rasch et al. .................... 385/1 |
| 6,729,730 B1 | * | 5/2004 | Ito .............................. 353/20 |
| 6,739,723 B1 | * | 5/2004 | Haven et al. ................. 353/20 |
| 2002/0036833 A1 | * | 3/2002 | Miyata et al. ............... 359/651 |
| 2004/0239889 A1 | * | 12/2004 | Inamoto ....................... 353/69 |

FOREIGN PATENT DOCUMENTS

NL 8602406 * 4/1987 ................. 385/146

* cited by examiner

*Primary Examiner*—Akm Enayet Ullah

(57) ABSTRACT

The present invention relates to an optically integrated device, and more particularly, to an optically integrated device with low light loss. A color filter is attached to an optical integrator to filter through a portion of the light, and reflect the other portion of the light back to the optical integrator. The optically integrated device recycles the reflected light inside the optical integrator to prevent light loss.

13 Claims, 3 Drawing Sheets

OPTICALLY INTEGRATED DEVICE

BACKGROUND OF THE INVENTION

1. Field of the Invention

The present invention relates to an optically integrated device, and more particularly, to an optically integrated device with a high luminous efficiency.

2. Description of the Prior Art

The optical system is improved as fast as the science develops. How to enhance the luminous efficiency, use low power consumption and remain the same volume of the optical system is very important. For example, the DLP (Digital Light Processing) image-processing system has the advantages of the high luminous efficiency and a small volume.

As shown in FIG. 1, the optical integrator 3 of the DLP image-processing system is a pillar with four side surfaces and two end surfaces. There is a rectangular light inputting face 5 on an end surface, and at the other end surface is a light outputting face 9. A reflective part 7 is distributed over the side surfaces. When the light L is emitted from the light source 1, a portion of the light L may directly penetrate through the optical integrator 3 to be filtered through a color wheel 11. The other portion of the light L that does not directly penetrate the optical integrator 3 is reflected by the reflective part 27 to penetrate the light outputting face 9, and to be filtered through the color wheel 11.

The rectangular light inputting face 5 adjusts the shape of the light L to project a rectangular image. If the shape of the cross-section of the light source 1 is circular, a portion of the light L, as the light L', is lost. So that the luminous efficiency of the optical integrator is limited due to the lost light L'.

Moreover, a portion of the light L may be lost due to the color filter 11. As shown in FIG. 1, the light L is filtered through the color filter 11 to become the light $L_0$, and is reflected by the color filter 11 to become the light $L_0'$. The color of the light $L_0$ and the area of the color wheel 11 that filtered the light $L_0$ through is the same. Neither the reflected light $L_0'$ and a small portion of the light L that is absorbed by the optical integrator 3 and the color wheel 11 are lost. Because the multiple colors are included in color wheel 11, the reflected light $L_0'$ is lost which limits the luminous efficiency of the image-processing device.

An improved DLP image-processing device includes multiple DMDs (Digital Micromirror Devices) to enhance the luminous efficiency. The light L is separated by a plurality of prisms, which include a Red light, a Green light and a Blue light due to the different refractive indexes of the different primary colors. The image-processing device includes, multiple DMDs, which enhances the luminous efficiency, because most primary colors are projected on the DMDs to form the image. However, the DLP image-processing device including multiple DMDs enhances the luminous efficiency, the volume and the cost of the production at the same time.

According to the above description, it's necessary to develop an image-processing device with a higher luminous efficiency, a smaller volume and a more economical cost.

SUMMARY OF THE INVENTION

According to the above description of the background of the invention, it is one objective of the present invention to provide an optically integrated device that recycles the reflected light by redesigning the relationship between the optical integrator and the color filter to enhance the luminous efficiency without increasing the amount of unnecessary elements. The color filters filter and reflect the light at the same time.

It is an another objective of the present invention to provide an image-processing device with a high luminous efficiency by redesigning the relationship between the optical integrator and the color filter without increasing the volume of the image-processing device.

It is a further objective of the present invention to provide an image-processing device with a high luminous efficiency by collecting the light to economize the cost of the production that enhances the luminous efficiency in the prior art.

The present invention provides an optically integrated device with low light loss by attaching or forming a color filter on the optical integrator to filter through a portion of the light, and reflect the other portion of the light back to the optical integrator. The optically integrated device recycles the reflected light inside the optical integrator to prevent the light loss to enhance the luminous efficiency.

All these advantageous features as well as others that are obvious from the following detailed description of preferred embodiments of the invention are obtained.

DESCRIPTION OF THE PREFERRED EMBODIMENT

In the present disclosure, the words a or "an" are to be taken to include both the singular and the plural. Conversely, any reference to plural items shall, where appropriate, include the singular.

The preferred embodiment of the present invention provides an optically integrated device to improve the disadvantages in the prior art. Nonetheless, it should be recognized that the present invention can be practiced in a wide range of other embodiments besides those explicitly described, and the scope of the present invention is expressly not limited except as specified in the accompanying claims.

The invention enhances the luminous efficiency of an optically integrated device by varying the relative position between a color filter and the optical integrator to recycle the light that is reflected from the color filter in order to enhance the luminous efficiency.

Figure 1:
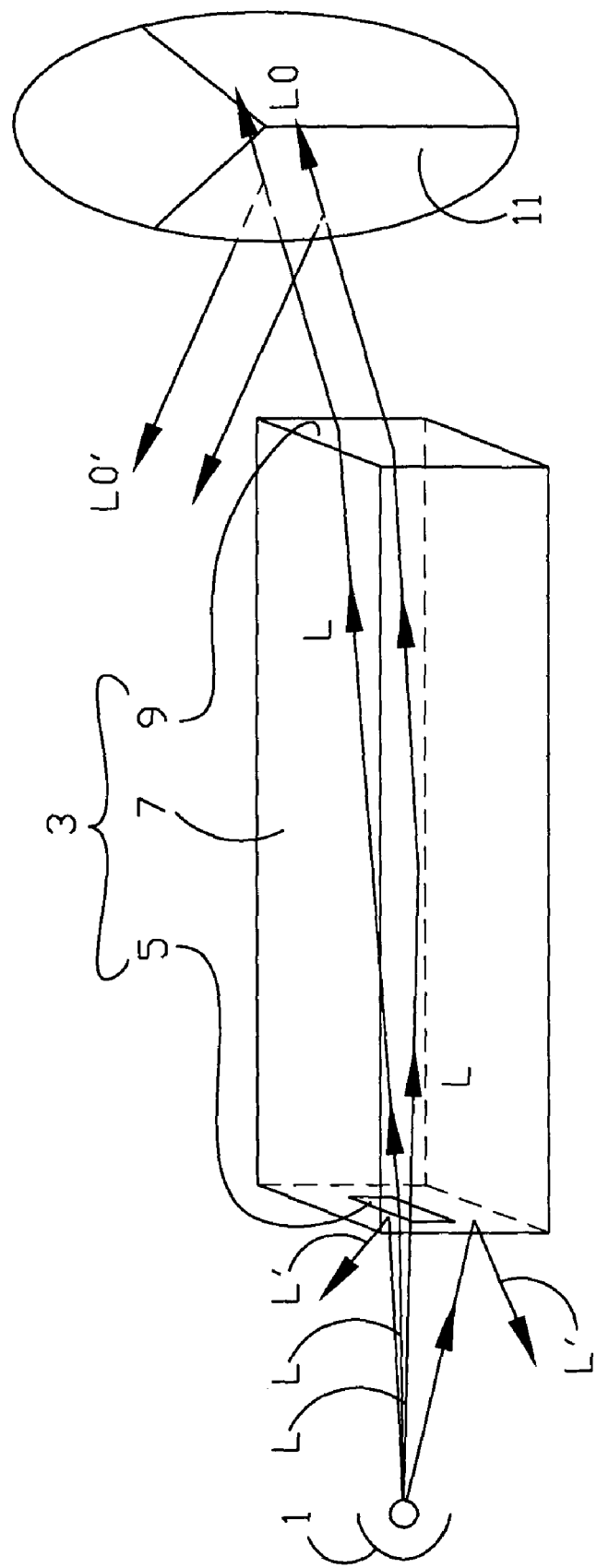
FIG. 1 is a three-dimensional perspective view of an image-processing device in the prior art.
Figure 2:
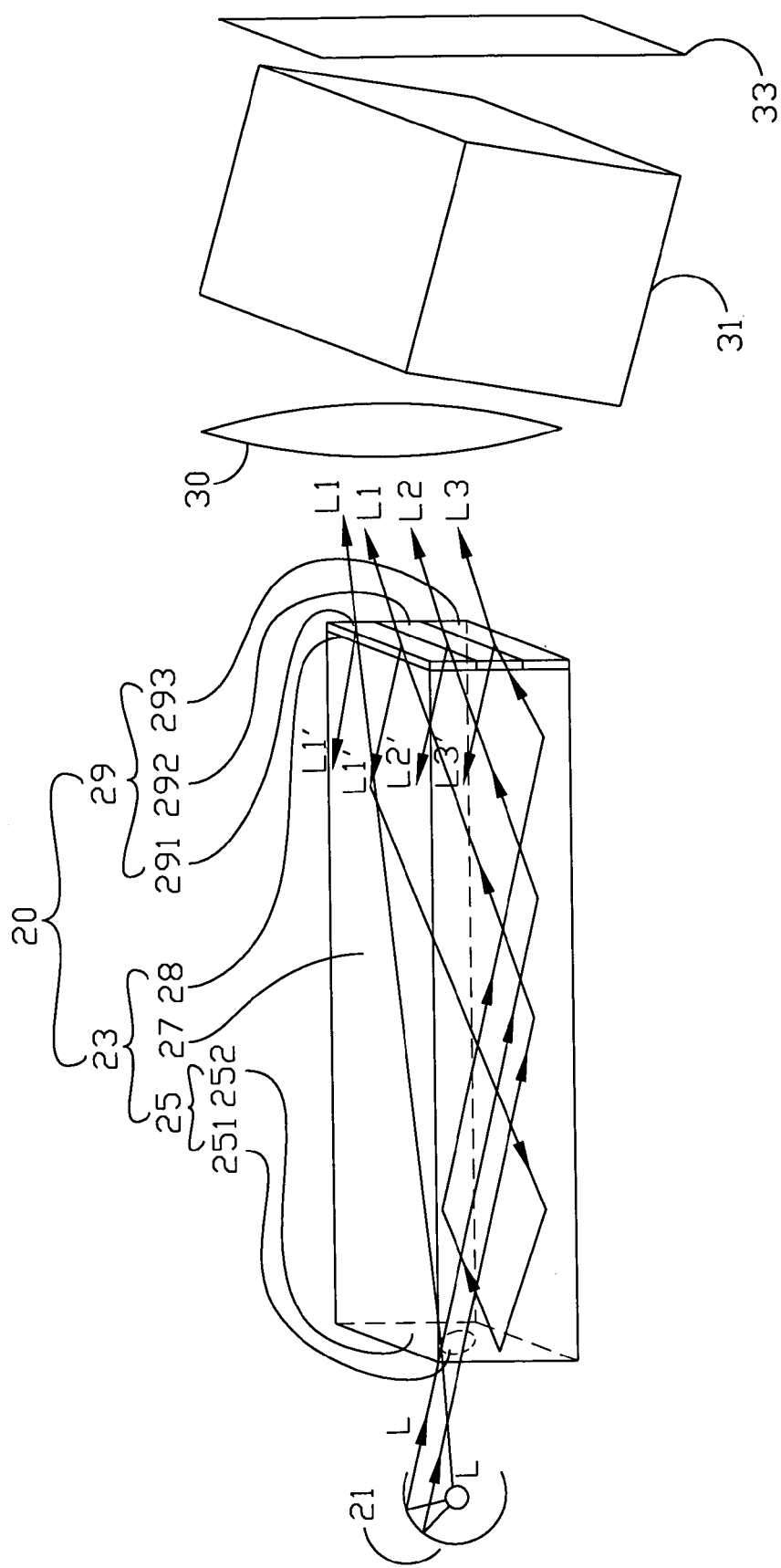
FIG. 2 is a three-dimensional perspective view of the first embodiment of the present invention.

A three-dimensional perspective view of the first embodiment is shown in FIG. 2. An image-processing device includes a light source 1, an optically integrated device 20 and an image-forming system that includes a scrolling prism 31 and an imaging face 33. The image-forming system may include a light-condensing element 30, i.e. a lens, for condensing light. The optically integrated device 20 is set between the light source 1 and the image-forming system.

The optically integrated device 20 includes the optical integrator 23 and the color filter 29 that includes multiple colors, i.e. Red, Green and Blue, wherein the layout of the colors is different according to the different designed optically integrated device. The optical integrator 23 includes a light inputting face 25, a light outputting face 28 and a reflective part 27. The color filter 29 is adhered on the light outputting face 28, wherein the color filter 29 includes a color filter 291, a color filter 292 and a color filter 293. The reflecting part 27 is set between the light inputting face 25 and the light outputting face 28 to reflect the light that entered inside the optical integrator 23. The reflective part 27 is distributed over the optical integrator 23 except the light inputting face 25 and the light outputting face 28. The light inputting face 25 includes a translucent part 251 and a reflector 252. The light L enters the optical integrator 23 through the translucent part 251. The reflector 252 reflects the light L that includes the light $L_1'$, the light $L_1'$ and the light $L_1'$ which enters the optical integrator 23.

Figure 3:
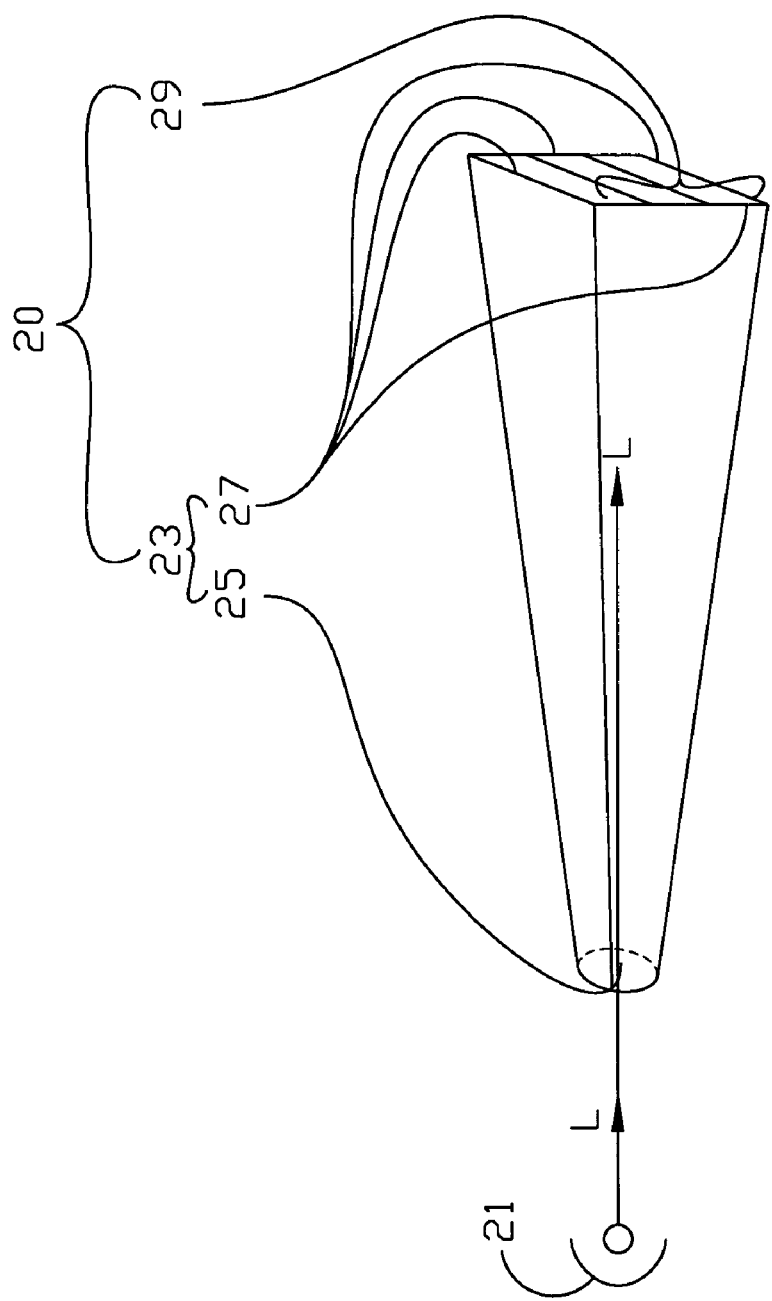
FIG. 3 is a three-dimensional perspective view of the second embodiment of the present invention.

As shown in FIG. 3, the light source 1, which preferably is a point light source positioned near the light inputting face 25, which directly emits the light L that passes through the translucent part 251, and the whole optical integrator 23. The reflective part 27 reflects a portion of the light L that cannot pass directly through the whole optical integrator 23. The light L is filtered through the color filter 29. The light $L_1$ is filtered through the color filter 291. The light $L_2$ is filtered through the color filter 292. The light $L_3$ is filtered through the color filter 293. Light $L_1$, $L_2$ and $L_3$ will pass through the scrolling prism 31 after being condensed by the light-condensing element 30. The scrolling prism 31 rotates to periodically project the light $L_1$, the light $L_2$ and $L_3$ on different portions of the imaging face 33. The light $L_1$ is projected on the higher portion of the imaging face 33, the light $L_2$ is projected on the middle portion of the imaging face 33, and the light $L_3$ is projected on the lower portion of the imaging face 33 before rotating the scrolling prism 31. When the scrolling prism 31 rotates, it projects the light $L_1$ on the middle portion of the imaging face 33, projectes the light $L_2$ on the lower portion of the imaging face 33, and projectes the light $L_3$ on the higher portion of the imaging face 33. If the scrolling prism 31 rotates continuously, the light $L_1$ is projected on the lower portion of the imaging face 33, the light $L_2$ is projected on the higher portion of the imaging face 33, and the light $L_3$ is projected on the middle portion of the imaging face 33. The light $L_1$ is continuously projected on the higher portion of the imaging face 33, the light $L_2$ is continuously projected on the middle portion of the imaging face 33, and the light $L_3$ is continuously projected on the lower portion of the imaging face 33 after rotating the scrolling prism 31. By the way, the scrolling prism 31 may be replaced with a different device that periodically projects the light $L_1$, the light $L_2$ and the light $L_3$ on different portions of the imaging face 33. The image-forming system may includes other elements to treat the light $L_1$, the light $L_2$ and the light $L_3$ for forming the image.

As shown in FIG. 2, some portions of the light L emitted from the light source 1 passes through the whole optical integrator 23 from the light inputting face 25 directly to the color filter 29. The reflective part 27 reflects other portions of the light L that cannot directly pass through the optical integrator 23 to filter the light L through the color filter 29. When the light L is filtered through the color filter 29, some portions of the light L pass through the color filter 29, and some portions of the light L is reflected from the color filter 29 to stay inside the optical integrator 23. The color of the light L that passes the color filter 29 and the color of the color filter 29 are the same. The color of the light L that is reflected from the color filter 29 is different from the color of the color filter 29.

For example, a portion of the light L is filtered as light $L_1$ through the color filter 291, and a portion of the light L is reflected to be the light $L_1'$ by the color filter 291. The image-forming system treats the filtered light, the light $L_1$, as the same image. The reflected light $L_1'$ is reflected by the reflective part 27 and the reflector 252, which filtered through the color filter 292 and the color filter 293, which is filtered as light $L_2'$ and $L_3'$. Even though a small energy of the light is absorbed after every reflection and every filtration, the luminous efficiency of an optically integrated device 20 goes up quite substantially.

The color filter 29 may be a color selective panel or a plurality of the color selective panels adhered onto the light outputting face 28, wherein the layout of the colors is different when the style of the optically integrated device is different. The color filter 29 may be formed by the dyeing method, pigment dispersed method, printing method, electrodepositing method and inkjet printing technology, or a composition of the above. It is certainly an advantage to use an improved method or a new method to form the color filter 29.

As shown in FIG. 2, the optical condenser 24 is a solid taper rod. The optical integrator 23 is a solid hexahedron. The translucent part 251 has a preferred circular shape to receive the circular light L to increase the probability of receiving light. Alternatively, the optical integrator 23 may be a hollow hexahedron as shown in FIG. 3. The light inputting face 25 may be a face with a hole. For example, the hole is the translucent part 251, and the reflector 252 is formed on the face. The light L enters the optical integrator 23 through the hole, as the translucent part 251. The reflector 252 that is formed on the face reflects the light L being inside the optical integrator 23.

The optical integrator 23 may be a different shape as shown in FIG. 3. The optical integrator 23 of the second embodiment of the present invention is a tapered cylinder. The shape of the optical integrator 23 may be different from all shapes of the preferred embodiments described above.

As shown in FIG. 3, the optical integrator 23 includes a light inputting face 25 and a reflective part 27 without a light inputting face. The optically integrated device 20 includes the optical integrator 23, that is a hollow hexahedron, and a color filter 29, that is fixed on the optical integrator 23. The color filter 29 may be a color selective panel, a spectroscope, or another device could filter through the color of the light.

The optically integrated device includes the color filter that is attached on the optical integrator to filter through a portion of the light, and to reflect the other portion of the light back to the optical integrator. The optically integrated device recycles the reflected light, which is reflected by the color filter, inside the optical integrator to prevent light loss. Adhering, fixing or forming the color filter on the optical integrator of the present invention enhances the luminous efficiency without unnecessary elements, which at the same time may increase the luminous efficiency, the cost and the volume of production.

The above description only demonstrates and illustrates the preferred embodiments of the present invention, but does not limit the scope of the present invention to what described detailed herein; and any equivalent variations and modifications of the present invention should be within the scope of the claims hereafter.

What is claimed is:

1. An optically integrated device, comprising:
    an optical integrator comprising a hollow pillar having a light inputting face comprising a translucent part and a reflector, a light outputting face and a reflective part distributing over said pillar's inside surface, said reflective part and said reflector reflecting the light inside said optical integrator and being positioned between said light inputting face and said light outputting face; and a color filter attached on said light outputting face.

2. The optically integrated device according to claim 1, wherein said color filter comprises multiple colors.

3. The optically integrated device according to claim 2, wherein colors of said color filter are Red, Green and Blue.

4. The optically integrated device according to claim 2, wherein said color filter is a color selective panel adhered on said light outputting face.

5. The optically integrated device according to claim 2, wherein the forming method of said color filter is selected from the group consisting of dyeing method, pigment dispersed method, printing method, electrodepositing method and inkjet printing technology, or composition of above all or either.

6. The optically integrated device according to claim 1, wherein said optical integrator is a hollow hexahedron pillar.

7. The optically integrated device according to claim 1, wherein said translucent part is circular.

8. An optically integrated device, comprising:
   an optical integrator including a hollow pillar having a light inputting face comprising a translucent part and a reflector and a reflective part distributing over said pillar's inside surface; and
   a color filter, fixed on said optical integrator, wherein said reflective part and said reflector reflect the light inside said optical integrator and are positioned between said light inputting face and said color filter.

9. The optically integrated device according to claim 8, wherein said color filter is a color selective panel.

10. The optically integrated device according to claim 8, wherein colors of said color filter are Red, Green and Blue.

11. The optically integrated device according to claim 8, wherein said translucent part is circular.

12. An image processing device, comprising:
    a light source;
    an optically integrated device comprising a hollow pillar comprising a light inputting face having a translucent part and a reflector, a color filter and a reflective part distributing over said pillar's inside surface, said reflective part being positioned between said light inputting face and said color filter; and
    an image-forming system treating the light passed through said color filter to form an image; wherein said optically integrated device is positioned between said light source and said image-forming system, said light source positioned nearly said light inputting face, said image-forming system is positioned nearly said light outputting face.

13. The optically integrated device according to claim 12, wherein colors of said color filter are Red, Green and Blue.

* * * * *